(No Model.)

K. P. ALSTON, Jr.

COMBINED OPENER, LISTER, AND GUANO DISTRIBUTER.

No. 246,651. Patented Sept. 6, 1881.

UNITED STATES PATENT OFFICE.

KEMP P. ALSTON, JR., OF WARRENTON, NORTH CAROLINA.

COMBINED OPENER, LISTER, AND GUANO-DISTRIBUTER.

SPECIFICATION forming part of Letters Patent No. 246,651, dated September 6, 1881.

Application filed June 16, 1880. (No model.)

*To all whom it may concern:*

Be it known that I, KEMP P. ALSTON, Jr., of Warrenton, in the county of Warren and State of North Carolina, have invented certain new and useful Improvements in Combined Opener, Lister, and Guano-Distributer; and I do hereby declare that the following is a full, clear, and exact description of the invention, which will enable others skilled in the art to which it appertains to make and use the same, reference being had to the accompanying drawings, which form a part of this specification, and in which—

Figure 1:
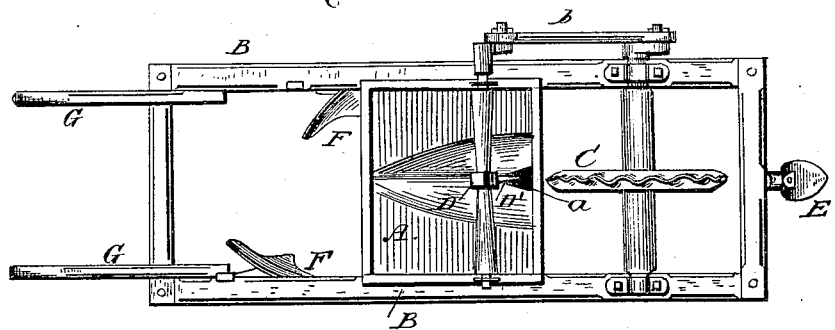
Figure 2:
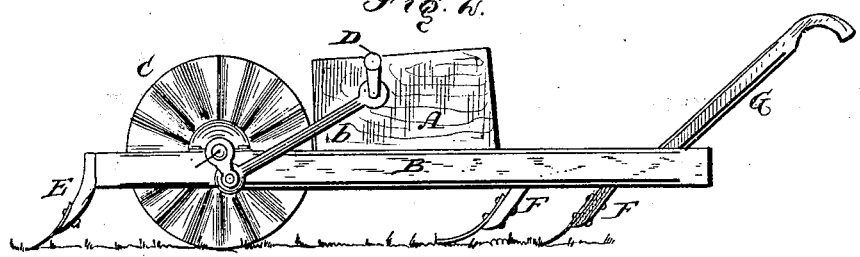

Figure 1 is a plan view of my improved combined opener, lister, and guano-distributer; and Fig. 2 is a side elevation of the same.

This invention relates to improvements in a combined opener, lister, and guano-distributer, its object being to open the ground to form a furrow to mellow the soil in the line of planting or fertilizing, and to sow the guano in said furrow and to cover the sowed guano; and it consists in a peculiar radially-corrugated riding-wheel, which will mellow the soil upon each side of the line of progress and serve to form a horizontal bed in the bottom of the furrow or drill.

In the accompanying drawings, A indicates the hopper or receptacle for the guano or fertilizer, with its bottom provided with an opening, *a*, triangular in shape, through which the guano or fertilizer is sown. The bottom, around the opening *a*, is made slanting toward said opening to aid the feeding of the fertilizer. This hopper is supported upon a suitable frame, B, mounted upon the axle of the driving and transporting wheel C.

D is the stirrer or agitator shaft, hung across the hopper or receptacle A, and having the agitator or stirrer D', which is adapted as the shaft is vibrated, as presently seen, to move back and forth in an arc over the opening in the bottom of the hopper, and thus stir and loosen the guano or fertilizer and effect the dropping of the same and permit it to be sown. The agitator or stirrer shaft is connected by a crank on itself and a pitman, *b*, to the driving-shaft, also having a crank or eccentric. Through this mechanism the agitator or stirrer shaft derives its vibratory motion.

E is the ground-opening plow, adjusted at the forward end of the frame supporting the hopper, and which forms the furrow for the reception of the guano or fertilizer.

F are the covering shovels or plows, one hung or adjustably connected to each side of the frame supporting the hopper, and arranged diagonally opposite each other, to effect the covering of the sown guano or fertilizer, and each shoveling its dirt without conflict with the operation of the other.

G G are the handles, suitably attached to the rear ends of the side pieces of the frame B, for steadying and guiding the machine.

This machine is simple, easily manipulated, and effective in its operation.

The essential feature of the invention is the wheel C, radially corrugated, as shown, to form a scalloped periphery, the lateral extremities of which corrugations extend beyond the line of the drill and serve to furnish a broad flat bottom to the drill of mellow soil.

I am aware that riding-wheels have been before employed following in the track of the opener, such wheels being provided with various means for effecting a vibratory motion in the planting mechanism. Such constructions are not sought to be covered in this application.

What I claim is—

In a seeding, planting, and fertilizing machine, the combination, with the hopper A, stirrer D, and frame, of a transporting-wheel, C, following in the line of travel of the opener, and provided with radial corrugations, as shown, adapted to mellow and prepare the bottom of the drill, as and for the purposes set forth.

In testimony that I claim the foregoing as my own I have hereto affixed my signature in presence of two witnesses.

KEMP PLUMMER ALSTON, JR.

Witnesses:
MARIA CLEMENTS,
JAMES B. SOMERVILLE.